A. ROCKWOOD.
TRANSPLANTING BOX.
APPLICATION FILED NOV. 1, 1909.

965,601.

Patented July 26, 1910.
2 SHEETS—SHEET 1.

Witnesses:

Inventor:
Anna Rockwood
By her Attorneys:

A. ROCKWOOD.
TRANSPLANTING BOX.
APPLICATION FILED NOV. 1, 1909.

965,601.

Patented July 26, 1910.
2 SHEETS—SHEET 2.

Witnesses:
L. L. Simpson
A. H. Opsahl

Inventor:
Anna Rockwood
By her Attorneys:
Williamson & Merchant

# UNITED STATES PATENT OFFICE.

ANNA ROCKWOOD, OF ST. PAUL, MINNESOTA.

TRANSPLANTING-BOX.

965,601.

Specification of Letters Patent. Patented July 26, 1910.

Application filed November 1, 1909. Serial No. 525,679.

*To all whom it may concern:*

Be it known that I, ANNA ROCKWOOD, a citizen of the United States, residing at St. Paul, in the county of Ramsey and State of Minnesota, have invented certain new and useful Improvements in Transplanting-Boxes; and I do hereby declare the following to be a full, clear, and exact description of the invention, such as will enable others skilled in the art to which it appertains to make and use the same.

My invention has for its object to provide a simple and efficient transplanting box, and to this end, it consists of the novel devices and combinations of devices hereinafter described and defined in the claims.

In the accompanying drawings, which illustrate the invention, like characters indicate like parts throughout the several views.

Figure 1:
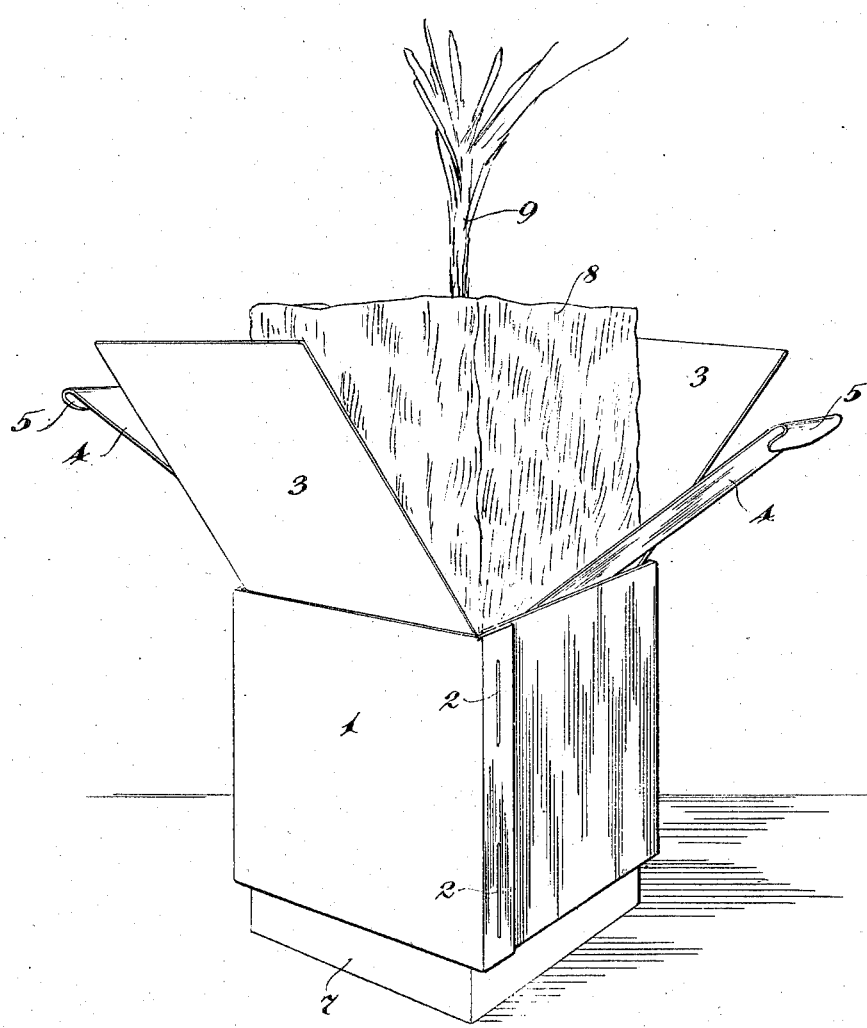
Figure 2:
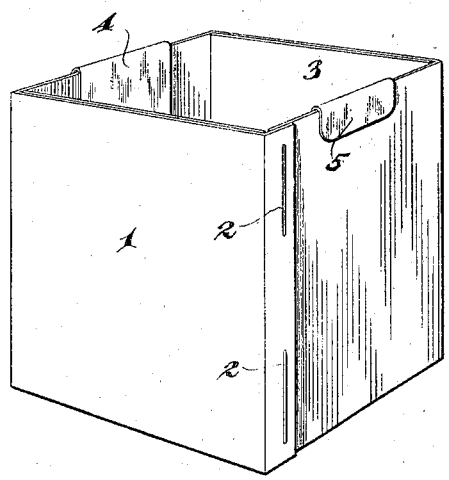
Figure 3:
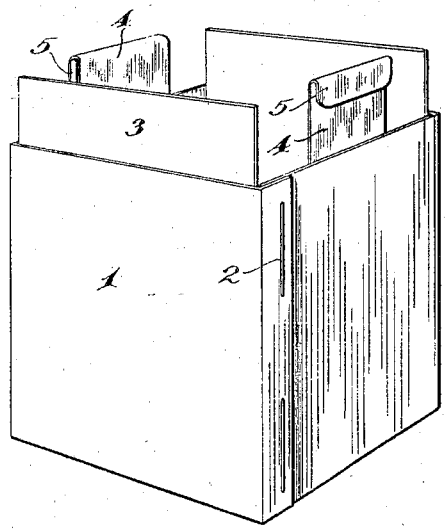
Figure 4:
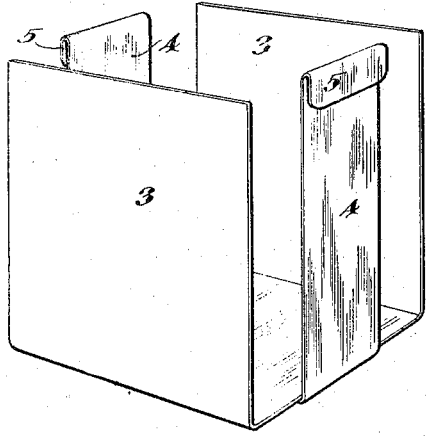
Figure 5:
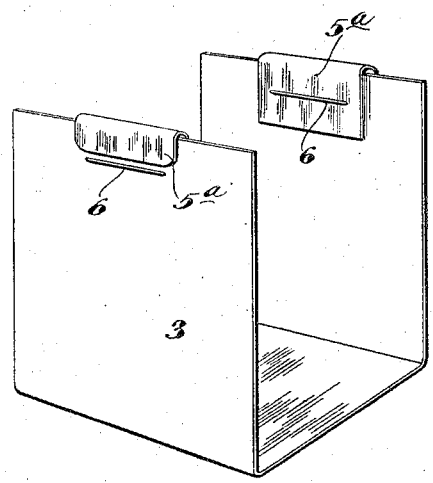

Referring to the drawings, Figure 1 is a perspective view, showing the improved transplanter and a plant in position to be removed therefrom; Fig. 2 is a perspective view of the transplanting box with the parts thereof in assembled condition; Fig. 3 is a perspective view of the box showing the inner shell thereof slightly raised; Fig. 4 is a perspective view of the inner shell of the box removed from the outer shell; and Fig. 5 is a perspective view showing a modified form of the inner shell of the box.

The improved transplanting box is made up of an outer shell and an inner shell, the latter of which, when placed within the former, is held in position to receive the plant and the earth but which, when removed from said outer shell, is adapted to be opened up so that the earth in which the plant is grown may be readily engaged with the hands for the purpose of transplanting.

The outer shell 1 is preferably rectangular with open top and bottom, and it will advisably be made from a strip of tin, wood, cardboard or heavy and stiff paper, the edges of which are secured at one corner of the box by wire stitches or clenched staples 2.

The inner shell comprises an approximately U-shaped plate 3 that is bent to fit within the outer shell 1. In the preferred form of the device, a U-shaped strip 4 is secured to the bottom of the plate 3 extending transversely thereof, and the upper ends of said strip 4 are bent downward to form hook ends 5 adapted to engage with the upper edges of the sides of the outer shell 1, to limit the downward movement of the inner shell. Preferably, the plate 3 is constructed from wood and the strip 4 will be preferably constructed from thin sheet metal, such as galvanized iron, zinc or tin plate.

In the modified form shown in Fig. 5, in lieu of the metal strip 4, small sheet metal hook plates 5ᵃ are secured to the upper edges of the said plate 3, preferably by staples or wire stitches 6. This inner shell can also be arranged to fit closely within the outer shell 1 and the ends of the hook plates 5ᵃ will engage with the upper edges of the sides of said outer shell, to limit the downward movement of the inner shell.

The use of the device is probably obvious from the drawings and description given, but the following statements are thought advisable. When the inner shell is placed in working position within the outer shell, as shown in Fig. 2, the box made up thereby is filled with dirt and the seed is planted therein. When the time for transplanting comes, the inner shell is forced upward out of the outer shell and this may be conveniently done by placing the bottom of the inner shell upon a square block 7, as shown in Fig. 1, and thereby forcing the outer shell downward over the said block until the inner shell is nearly or quite removed from the outer shell. When this has been done, the sides of the inner shell may be readily forced outward and downward, as shown in Fig. 1, and the compact body of dirt 8 containing a plant 9 may then be readily engaged with the hands and, hence, without disturbance of the roots of the plant, properly deposited in the soil where it is to be finally planted.

After the plant has been transplanted, the outer shell 1 may be placed around the plant, with its lower edge forced into the ground a half inch or more and, when so applied, it serves as an efficient device to prevent cut worms from getting at the plant.

The transplanting device above described is of very simple construction, is of small cost, may be used over and over again, and is generally efficient for the purposes had in view.

What I claim is:

1. A transplanting box comprising an outer shell and an inner shell, which inner shell is provided with sides adapted to be folded outward from their upper edges and provided at their upper edges with hook ends for engagement with the upper edges of the sides of said outer shell.

2. A transplanting box comprising a rectangular outer shell open at top and bottom, and an inner shell comprising a bottom and four side members secured to said bottom and certain of said side members being adapted to be folded outward from their upper edges and provided with hook ends for engagement with the upper edges of the sides of the outer shell, substantially as described.

In testimony whereof I affix my signature in presence of two witnesses.

ANNA ROCKWOOD.

Witnesses:
ALICE V. SWANSON,
HARRY D. KILGORE.